May 21, 1968  R. C. IVY ETAL  3,384,812
PRECISION POWER SUPPLY FOR HIGH CURRENTS OR VOLTAGES
Filed April 8, 1966  2 Sheets-Sheet 2
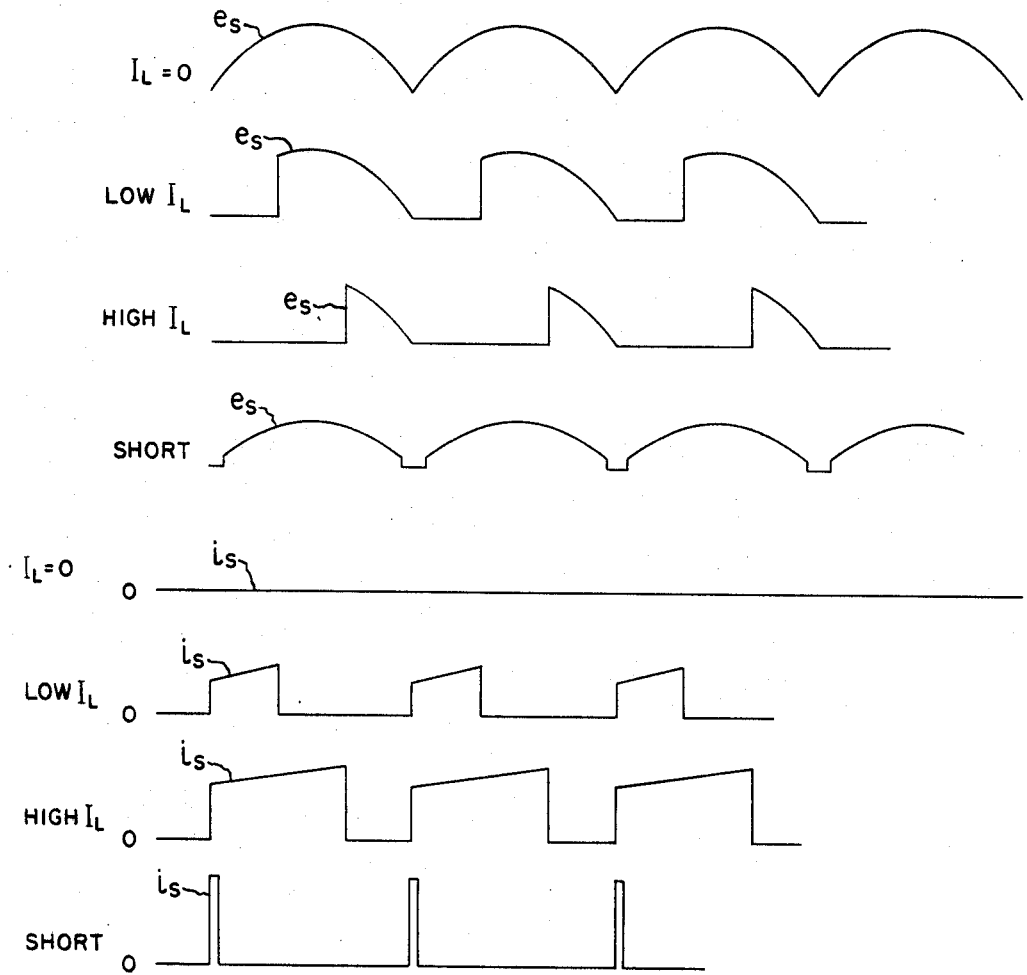
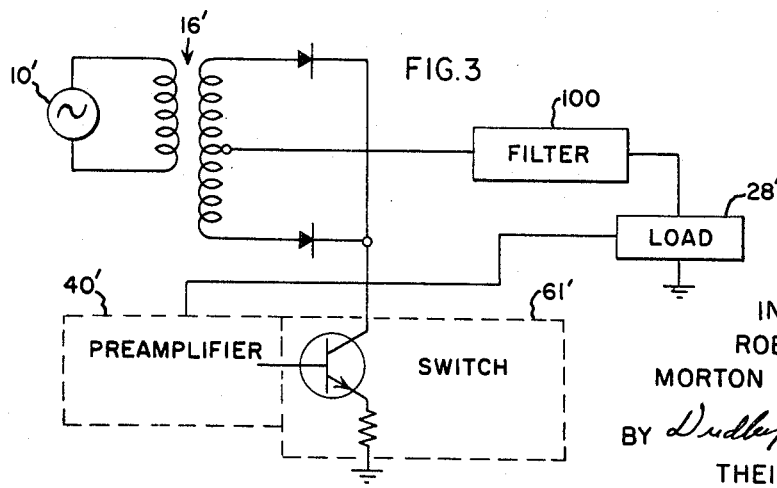
INVENTORS:
ROBERT C. IVY,
MORTON P. WOODWARD, JR.
BY Dudley T. Ready
THEIR ATTORNEY.

United States Patent Office 3,384,812
Patented May 21, 1968

3,384,812
PRECISION POWER SUPPLY FOR HIGH CURRENTS OR VOLTAGES
Robert C. Ivy and Morton P. Woodward, Jr., Vestal, N.Y., assignors to General Electric Company, a corporation of New York
Filed Apr. 5, 1966, Ser. No. 540,256
7 Claims. (Cl. 323—4)

This invention is directed to solid-state electrical apparatus for controlling the voltage and/or current applied to a load. It is particularly useful for maintaining a selected constant average current in motors and other inductive loads.

Much effort in recent years has been devoted to solid-state regulating circuits. As a result, various circuits using silicon controlled rectifiers, power transistors, etc., have been used successfully for motor control, voltage regulation, etc. However, most regulation circuits employ controlled power dissipation to maintain the desired constant voltage and/or current at the load. This presents problems in maintaining satisfactory efficiency and in the selection of the components which must function with relatively high voltages and must have a tolerance for overload conditions.

A highly significant aspect of the invention is concerned with the practical allowances required for variations in load conditions in respect to design and operation. For example, in designing control circuits for a particular D-C motor application, it is necessary to consider both the details of the expected variable mechanical loading and the resistance and inductance of the motor circuits. Actually, the usual objective is to provide the appropriate torques for given loads on the motor, and torque in a D-C motor is directly proportional to current. However, conventional control circuits control the motor voltages. On the other hand, it is desirable to have a very high gain feedback loop in order to assure accurate control. This combination of dependence on the specific loading impedance and high gain leads to stability requirements which makes the design and operation of motor controls significantly dependent upon correct analysis and reliable component characteristics.

It is desirable that regulator circuits be capable of withstanding extreme conditions. In particular, it is highly advantageous to have the capability of tolerating a short-circuit condition in the load. This means that the regulator components must be able both to survive the signal surges asociated with a short-circuit load and to limit the loading effect of the short on the power source so as to protect the source.

A special problem with circuits having silicon controlled rectifiers and thyratrons is the hysteresis aspect of their operation characteristics. If noise triggers the devices, a firing effect occurs, completely out of proportion to the noise signal amplitude. Normally, a complete control cycle is then commenced which results at least in highly undesirable control actions.

Another area of difficulty arises when the load is in an "open-circuit" or near open-circuit condition. Particularly with time-ratio control, there is a tendency for erratic behavior. This is caused by near limit conditions. For example, if a control circuit relies on cyclically integrating a sensing signal proportional to the load current, at some point, spurious signals due to noise, stray inductance, etc., will dominate the feedback sensing signal, causing unpredictable performance.

Accordingly, it is an object of the invention to provide a control system in which the load reactance has little or no effect on the control operations.

It is a further object of the invention to provide a precision regulating circuit which places low operating requirements on the solid-state elements directly controlling the load power.

It is another object of the invention to provide a regulator which is protected against open-circuits and closed-circuits.

It is a further object of the invention to provide a precision time-ratio regulator in which the timing switches are subjected to only a small proportion of the voltage they are controlling.

It is another object of the invention to provide a time-ratio type of regulator in which the switches are insensitive to minor spurious signals.

It is a further object of the invention to provide a time-ratio control circuit in which the voltage spikes commonly occurring across the load in each half-cycle is avoided.

It is another object of the invention to provide a practical, reliable, solid-state D-C control circuit for an A-C power source.

Briefly stated, the invention uses a time-ratio approach with a regenerative switch. The salient feature of the invention is the particular use of a feedback amplifying device to enhance ON-OFF operation of the switch. While an ON-OFF amplifying device (serving as a switching element) determines the beginning of each half cycle, the feedback amplifying device is made responsive to voltage across it. Because of the device ($v_{ce}$–$i_c$) characteristic, an overcurrent is inherently accompanied by a voltage rise. The feedback device is made responsive to this voltage rise so as to turn the ON-OFF device OFF automatically and regeneratively. This switch is placed between a transformer center-tap and ground so that load current can be effectively monitored directly while only a small fraction of the voltage is applied to the devices as compared with conventional time-ratio control circuits. Because the control voltage level is readily adjustable, motor torque level and the like can be continuously varied in addition to regulation and overload protection. Furthermore, the circuit is automatically reset by the pulsating power supply so that re-start after removal of a short is automatic.

The invention, together with further objects and advantages thereof, may best be understood by referring to the following description taken in conjunction with the appended drawings in which like numerals indicate like parts and in which:

FIGURE 2 is a set of waveforms illustrating operation of the FIGURE 1 control circuits.

FIGURE 3 is another example of an application of the invention.

Figure 1:
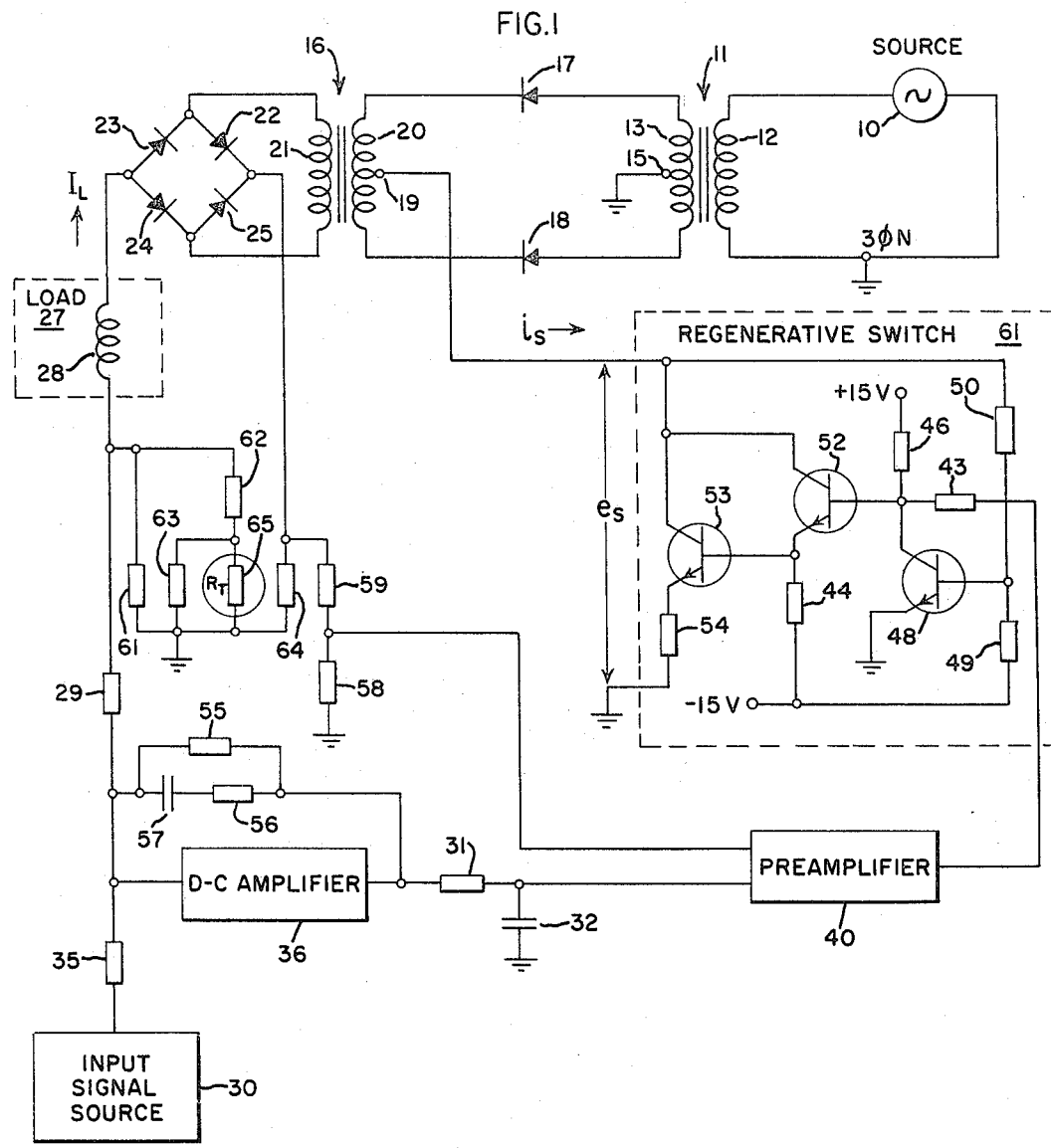
FIGURE 1 is a schematic diagram of a preferred embodiment of the invention in a representative application.

In the embodiment of FIGURE 1, a source of A-C input power 10 is applied to a load 27 through a pair of center-tapped transformers 11 and 16. The input power signal is directly connected to the winding 12 of transformer 11. The center tap 15 on the secondary winding of this transformer is connected to ground and the center tap 19 on the primary winding of transformer 16 is connected to ground through regenerative switch circuit 61. The windings 13 and 20, having these center-taps, are connected in a loop thereby coupling the transformers 11 and 16 together with rectifiers 17 and 18 in this series loop with their respective cathodes connected directly to opposite ends of winding 20. During alternate half cycles, current flows in alternate halves of the winding 20. There is a voltage step-down to winding 13 which, in a vehicle for example, would typically be one of many windings on the power generator. The output is full-wave rectified by the conventional bridge comprised of rectifiers 22–25. The rectifiers 22–25 also allow a continuous current to flow through the load when the regenerative switch 61 is OFF. The output of the bridge is connected to the load 27, in this case primarily a large inductance 28, and a series load current signal sensing network consisting of resistors 61–65. The load signal is compared with a D-C reference signal from source 30 by means of D-C amplifier 36 and the summing resistors 29 and 35. The load signal $I_L$ and the reference signal are applied to amplifier 36 with a subtractive relationship. The output of amplifier 36 is applied to the equalization network consisting of resistor 31 and capacitor 32 and the input impedance of amplifier 40. The resulting signal is compared with a portion of the load signal by the network consisting of resistors 58 and 59 and the amplifier 40. The load signal and the equalized error signal are applied with a subtractive relationship. The resulting signal is applied to the base of transistor 52. Bias for the transistor junctions is provided by the resistors 46, 49 and 50 which are connected to ±15 volt lines and have resistance values such as to normally bias transistor 48 in a non-conducting or "OFF" state. They are poled so that the emitter voltage does not fall below ground level and the base voltage does not fall below the emitter voltage (neglecting the forward conduction drop across the junction). Appropriate ON-OFF switching is provided by the transistor pair 52 and 53. Normally OFF transistor 48 keeps cascaded switching transistors 52 and 53 normally ON and center-tap 19 thereby connected to ground. The D-C amplifier 36 serves to provide an appropriate load impedance for the control signals and enables a lag-lead characteristic in the forward loop gain by means of lead-lag signal shaping in the resistance-capacitance feedback network 55–57. The resistor network 58 and 59 in series with the load provides an additional feedback signal outside the lead-lag network for additional stability. The network of resistors 61–65 including a negative temperature coefficient resistor 65 provides a desired change in the load current as a function of temperature. Three cascaded stages of differential amplification with a single-ended output driver have been found satisfactory for providing amplifier 36 with an accurate summing point, but other standard operational amplifiers are generally satisfactory.

FIGURE 2 illustrates operation of the FIGURE 1 regulator under various load current conditions by showing the voltage $e_s$ and current $i_s$ applied to regenerative switch 61, which uses amplifying devices in ON-OFF states. With $I_L=0$, the source voltage, reduced by the transformer 11 step-down ratio, actually appears across the switch 61, but with the switch in an open circuit condition, the current is negligible so that the solid-state components are not stressed. For low to high $I_L$ load conditions, the switch 61 is ON at the beginning of each half-cycle and remains ON until the integrated current reaches the selected level for a half-cycle when preamplifier 40 starts to turn transistors 52 and 53 OFF. The collector voltages rise from near ground level toward the voltage on secondary winding 13. The voltage rise turns ON transistor 48 initiating the regenerative action of switch 61. At the same time, the collector current $i_s$ drops to zero with the open circuit. For a short circuit load condition, the current $i_s$ is very high at the beginning of each half-cycle when preamplifier 40 turns ON transistors 52 and 53. Almost immediately, the voltages across resistors 44 and 54 rise sharply so that the transistor 53 and 52 turn OFF as transistor 48 turns ON. Ordinarily, the power is disconnected from the load at the level of collector current $i_s$ which produces a drop across resistor 54 such that the voltage produced at the junction of resistor 46 and resistor 43 by preamplifier 40 can no longer keep transistors 52 and 53 ON. The level at which this occurs is controlled by preamplifier 40 output as controlled by the feedback signal and the input signal source 30.

Representative component designations and circuit values for the FIGURE 1 circuit are:

| | |
|---|---|
| Rectifiers 17 and 18 | IN3189. |
| Rectifiers 22–25 | IN1731. |
| Transistors 48 and 52 | 2N720. |
| Transistor 53 | 2N1050B. |
| Resistor 43 | 2 KΩ. |
| Resistor 44 | 15 KΩ. |
| Resistor 46 | 9.76KΩ. |
| Resistor 49 | 48.7 KΩ. |
| Resistor 50 | 20.5 KΩ. |
| Resistor 54 | 2.5 Ω. |
| Resistor 31 | 9.76 KΩ. |
| Resistor 35 | 100 KΩ. |
| Resistor 29 | 86.62 KΩ. |
| Resistor 55 | 3.62 MΩ. |
| Resistor 56 | 73.2 KΩ. |
| Resistor 58 | 3.83 KΩ. |
| Resistor 59 | 8.87 KΩ. |
| Resistor 61 | 309 Ω. |
| Resistor 62 | 496Ω. |
| Resistor 63 | 126Ω. |
| Resistor 64 | 10Ω. |
| Capacitor 32 | 11 μf. |
| Capacitor 57 | .28 μf. |

The transistor 52 is connected as an emitter-follower to control transistor 53, thereby effectively increasing the gain of the latter. However, both transistors are normally operating in one of two conditions, conducting (ON) or nonconducting (OFF). Both of these transistors operate as conventional two-point amplifying devices. Their main characteristic is a roughly proportional current-out to signal-in characteristic. Vacuum tubes have somewhat similar characteristics in this regard but their ON resistance has been too high to be generally practical for time-ratio control of the present type. A related characteristic is that for a lower level signal at the base of transistor 52 (at the input port), a lower $v_{ce}$–$i_c$ (collector-emitter voltage vs. collector current) characteristic results. "For transistors 52 and 53, the lower the base signal, the greater voltage is required to maintain a given current." The signals $e_s$ and $i_s$ are approximately the aforesaid $v_{ce}$ and $i_c$, and the commencement of a control action means turning the transistors 52 and 53 OFF when the source voltage and high circuit inductance tends to keep the current constant. This lag feature drives the collector voltages up, which turns transistor 48 ON. This in turn lowers the signal applied to the bases of transistors 52 and 53 driving their collectors higher. This results in a strong regenerative action causing transistors 52 and 53 to turn OFF hard, and thereby function efficiently.

Each half cycle of operation is terminated at a point when the load current (as sensed by the voltage across a series resistor) reaches a certain level. Unless some special provision is made, such as integrating the sensed and control signals, operation can be limited to a fifty percent duty cycle, for example, where the load is not largely inductive. That is, a FIGURE 1 type of embodiment requires the load current to never decrease from the beginning of each half-cycle until the regenerative switch is turned OFF. Another factor is that the feedback amplifying device, transistor 48 must be turned OFF. The A-C power from source 10 produces a full-wave rectified signal at tap 19 which automatically resets transistor 48 each half-cycle. Dropping the base voltage or a corresponding operation is sufficient to turn transistor 48 OFF and complete resetting of regenerative switch 61.

A desirable feature of the FIGURE 1 circuit is that the primary switching transients occur towards the end of the half-cycles and constitute a change from source voltage to ground. With a conventional rectifier bridge 22–25, the rectifiers can pass signal spikes for a short time interval after a forward bias has changed to a reverse bias.

This is caused by charge carrier storage effects in semiconductors which produce effects that are similar in some respects to capacitance. With silicon controlled rectifiers in conventional control circuits, the result is voltage spikes which can damage components, induce improper firing signals, etc. In the FIGURE 1 circuit, there are spikes when transistors 51 and 52 are turned OFF. While conventional de-spiking networks can be used, it has been found that the spikes are not normally large enough to require them.

While the invention in the FIGURE 1 form has two transformers, one of these is frequently a necessary part of the existing power supply. As to the remaining transformer, while a solid state equivalent might save space, the transformers are very useful in providing flexibility in the voltage range tolerances for the switching devices.

One alternative embodiment is shown in FIGURE 3. This embodiment also presents a generalized application of the invention wherein a regulator maintains a constant average current condition in load 28' to which preamplifier 40' responds in order to control switch 61' for the proper time-ratio operation. As a result, power from source 10' is applied to the load through transformer 16' and a conventional LC filter 100. The primary features are the same as in FIGURE 1, a regenerative time-ratio switch in series with the load *and* a step-up transformer winding, and a time-ratio switch which automatically turns OFF for heavy overloading conditions. Furthermore, it automatically resets and starts again with the next half cycle.

While particular embodiments of the invention have been shown and described herein, it is not intended that the invention be limited to such disclosure, but that changes and modifications can be made and incorporated within the scope of the claims.

What is claimed is:
1. A control circuit comprising:
   (a) means for applying a series of time-ratio controlled power pulses to a load;
   (b) control means for deriving a signal representing the current level in the load;
   (c) a regenerative switch for regulating time-ratio control of the power;
   (d) said regenerative switch including an amplifying device responsive to said control means so as to control the time and said power pulses are applied to the load;
   (e) a second amplifying device, in said regenerative switch, providing positive feedback to said first amplifying device.
2. The control circuit of claim 1 further comprising:
   (f) a center-tap transformer for coupling the power pulses to the load, said regenerative switch being connected to the center-tap;
   (g) rectifiers connected in series with said transformer so that the power pulses flow alternately through the respective halves of the winding with the center-tap.
3. The control circuit of claim 1 further comprising:
   (f) wherein said first and second amplifying devices are transistors for which the regenerative action causes switching between the conducting and nonconducting states.
4. A control circuit comprising:
   (a) a transformer having a center-tapped winding coupling a source of A-C power to a load;
   (b) connecting means arranged so that power flows through the respective halves of the center-tapped winding only during alternate half-cycles;
   (c) a regulating switch for controlling the time-ratio of applied power by producing an open circuit condition when the desired power for each half-cycle is delivered including:
      (1) a solid-state amplifying device, for completing a circuit substantially directly coupled to said center tap, being thereby placed in series with the halves of said winding in respect to the applied power;
      (2) a control element, for operating said solid-state switch in accordance with the desired time-ratio and connected so that said switch automatically opens in response to excessive current in the load.
5. The control circuit of claim 4 further comprising:
   (d) a feedback amplifying device in said regulating switch responsive to the signal applied to said solid-state amplifying device for regeneratively driving it into its nonconducting state at the desired time-ratio switching point and when there is a short-circuit load condition;
   (e) said solid-state amplifying device having standard voltage-current characteristics which are proportional to a control signal.
6. The control circuit of claim 4 further comprising:
   (d) a second center-tapped transformer through which the A-C power is supplied to the aforesaid transformer with a voltage step-down;
   (e) a pair of rectifiers coupled between said transformers so as to insure that substantially reduced voltage is applied to said regulating switch.
7. The control circuit of claim 6 further comprising:
   (f) a feedback amplifying device in said regulating switch responsive to the signal applied to said solid-state amplifying device for regeneratively driving it into its nonconducting state at the desired time-ratio switching point and when there is a short-circuit load condition.
   (g) a load signal sensor for providing said control element with a signal proportional to load current;
   (h) an inductor element in the load having an inductance sufficiently large so that during any half-cycle of operation the current continues to increase at least for the major part of a half-cycle with a long duty cycle.
   (i) said amplifying devices being transistors.

References Cited

UNITED STATES PATENTS

| | | | |
|---|---|---|---|
| 3,098,966 | 7/1963 | Raver | 323—22 X |
| 3,122,701 | 2/1964 | Short et al. | 323—22 X |
| 3,218,546 | 11/1965 | James et al. | 321—18 X |

JOHN F. COUCH, *Primary Examiner.*

WARREN E. RAY, *Examiner.*

A. D. PELLINEN, *Assistant Examiner.*

UNITED STATES PATENT OFFICE
CERTIFICATE OF CORRECTION

Patent No. 3,384,812                 May 21, 1968

Robert C. Ivy et al.

It is certified that error appears in the above identified patent and that said Letters Patent are hereby corrected as shown below:

Column 5, line 46, cancel "and".

Signed and sealed this 7th day of October 1969.

(SEAL)
Attest:

Edward M. Fletcher, Jr.             WILLIAM E. SCHUYLER, JR.
Attesting Officer                    Commissioner of Patents